United States Patent

[11] 3,596,256

[72] Inventors Norman Alpert
Scarsdale, N.Y.;
Marvin Felcheck, Monsey, N.Y.; Wallace Kirschner, Trumbull, Conn.
[21] Appl. No. 848,466
[22] Filed Aug. 8, 1969
[45] Patented July 27, 1971
[73] Assignee Pitney Bowes-Alpex, Inc.
Danbury, Conn.

[54] TRANSACTION COMPUTER SYSTEM HAVING MULTIPLE ACCESS STATIONS
20 Claims, 7 Drawing Figs.
[52] U.S. Cl. .................................................. 340/172.5
[51] Int. Cl. ............................................. G06f 15/02, G06f 15/24
[50] Field of Search .......................................... 340/172.5; 235/157

[56] References Cited
UNITED STATES PATENTS

| | | | |
|---|---|---|---|
| 3,029,414 | 4/1962 | Schrimpf | 340/172.5 |
| 3,063,036 | 11/1962 | Reach et al. | 340/172.5 |
| 3,181,124 | 4/1965 | Hammel | 340/172.5 |
| 3,245,045 | 4/1966 | Randlev | 340/172.5 |
| 3,267,436 | 8/1966 | Alpert et al. | 340/172.5 |
| 3,302,189 | 1/1967 | Korkowski et al. | 340/172.5 |
| 3,303,476 | 2/1967 | Moyer et al. | 340/172.5 |
| 3,305,839 | 2/1967 | Looschen et al. | 340/172.5 |
| 3,315,235 | 4/1967 | Carnevale et al. | 340/172.5 |
| 3,323,119 | 5/1967 | Barcomb et al. | 340/172.5 |
| 3,335,407 | 8/1967 | Lange et al. | 340/172.5 |

*Primary Examiner*—Gareth D. Shaw
*Attorney*—Alexander and Dowell

ABSTRACT: A time-sharing system for entering into a central data processing unit information relating to transactions separately conducted at multiple remote access stations, and for processing and storing portions of this input information and returning portions of the processed data as messages to the remote stations, part of which data is displayed and/or printed. The returned messages also include indications to the operator of the remote station as to the next step that he should perform toward completing entry of the transaction. Each remote station is polled and enabled to transmit information to the central unit during a time slot in each complete cycle of time slots, but every remote station has its display refreshed with processed display data transmitted during every time slot to every remote station from the central unit, the display data always being composed into message blocks at the central unit prior to transmission thereof to the remote units. The time slots are brief and the rate at which the remote units are polled is very high as compared with the rate at which an operator can physically enter one input character, and therefore each remote unit when polled transmits to the central unit during its time slot only a single encoded data character and/or encoded program instruction, and the computer processes this fragmentary information accumulated during successive time slots, and over the succession of a large number of time-slot cycles it assembles and associates the complete data relating to the diverse transactions being simultaneously performed at many access stations. The drawings and specification provide an illustrative embodiment in which the remote stations are sales-point retail registers operated by clerks delivering sales data to a store's central processing unit and receiving back messages for displaying and printing out sales slip information.

INVENTORS
NORMAN ALPERT
MARVIN FELCHECK
BY WALLACE KIRSCHNER

Alexander & Dowell
ATTORNEYS.

INVENTORS
NORMAN ALPERT
MARVIN FELCHECK
WALLACE KIRSCHNER

BY Alexander & Dowell
ATTORNEYS.

TRANSACTION COMPUTER SYSTEM HAVING MULTIPLE ACCESS STATIONS

This invention relates to a computer system of the type which receives transaction information from multiple remote stations which are polled on a time sharing basis during repeating cycles of time slots, and in which a central processing unit continuously updates the information displayed at the remote stations.

The present invention includes a central unit having a computer capable of storing certain information, for instance relating to inventory, cash flow, etc., and the central unit also including an executive unit which contains a cyclic time sharing system driven by a local clock and delivering synchronizing signals to similar clock units at each of a plurality of remote access stations. The remote access stations provide input information to the central unit whenever they are polled by the latter, and the central unit then processes input information obtained over a series of successive time slots and composes message blocks which are simultaneously transmitted from the central unit to all of the remote units which are then currently operative, but each message block contains different information processed by the computer specifically for an associated remote station. The remote stations have no arithmetic capability and serve only to display data composed at the central unit, to drive printer solenoids with the data, to display sequential lighted instructions to the operator, to interlock data input functions, and to transmit to the central unit data entered thereat without composing entered characters into a message.

It is a principle object of this invention to provide a system of the type set forth above in which as much circuitry as possible has been removed from each of the remote stations and in which a system has be substituted at a central executive unit for performing on a time-sharing basis the functions formerly performed at each remote station in prior art systems. For instance, there are prior art systems in which each remote station composes a complete multiple-word message and then sends it to a central processing unit. However in the present system the information is always composed at the central unit. This approach effects considerably economy in the cost of the many remote stations in view of the fact that much of the message handling equipment at the executive unit of the present system can be time-shared among the multiple remote stations, thereby reducing unnecessary and expensive circuitry.

It is another major object of this invention to provide a system in which message blocks are composed at the central executive unit during every successive time slot, these message blocks being different for each active remote station, although being simultaneously composed and transmitted during each time slot in the overall succession of time slots. These message blocks include means for synchronizing the clocks in the remote stations, and means for indicating to each remote station the current status or mode of its present operation based upon an orderly program having steps, some of which have already been performed by that particular station in the process of entering the transaction currently in progress. Each message block can also include an enabling code which is a clear-to-send message to a remote station which is presently being polled, and each block further includes in serial form the processed data to be displayed at the particular remote station to which the message block is being sent. Finally, the message block includes encoded data to operate the printer, if any, at the associated remote station.

Still another object of the invention is to provide a system of the type described above especially designed for use by sales clerks in retail establishments, wherein each remote station comprises a sales register having the capability of entering information relating to items being sold, and having the capability of receiving back messages in the form of the above message blocks which include data to be displayed at the clerk's station. A particular feature of the system is that operation of the input sales station includes the transmission of program instructions to the central unit and the receiving back of mode messages from the central unit indicating the point in the succession of steps at which the clerk has arrived during step-by-step entry of data relating to a particular transaction. The remote registers include a series of sequential lights under instruction indicia, the lights being operated by the mode messages sent back from the computer to the remote station during each message block in each time slot, and these sequential lights lead the sales clerk through operation of his remote station in a logical manner, step-by-step, so as to insure proper operation of the system by each clerk without extensive special training.

It is another important object of the invention to provide a system in which the computer stores the items which form the subjects of sales transactions under unique item numbers with which, for instance in the case of a retail store, the various items are tagged. The operator of the system enters the item number of an item which the customer wishes to purchase, and the computer checks the entered number to verify that it is a valid number and then automatically prices the item, so that the clerk need not enter prices into the system under normal circumstances. The price of the item is returned to the remote sales-point station during the next few message blocks and is displayed upon the local display for the customer and the clerk to see. All required computations such as extensions of the item prices due to the purchase of multiple items, sales tax, totals, and indications of change due the customer are performed automatically at the central processing unit, and at each step the appropriate data is displayed at the sales-point station, this data arriving during subsequent message blocks which are in each time slot composed at the central unit and transmitted to the associated remote station at which the transaction is in progress.

If the entered item number is not valid, or the item does not have any item number assigned to it as yet, the mode signal from the computer informs the clerk that he should enter a price at his station. Keyboard means is provided for this purpose. Information normally entered into the remote stations by operators using the keyboard may alternatively be entered automatically by using suitable peripheral devices, such as punch card readers for reading merchandise tags, or even tape inputs from other types of input units. The system can also accept credit cards instead of tendered cash, and the computer may even include a credit file concerning those customers having credit cards. In addition, the remote registers include means for indicating which items are taxable items and which items are not, and the computer may include memory means for recording significant features of transactions for audit and inventory purposes.

Another object of the invention is to provide a time sharing multiple system in which the complete cycle of time slots repeats at a high rate, and each machine is polled many times during each elapsed second of real time. This polling rate is much higher than the rate at which operating personnel could possibly enter information manually at a keyboard. Thus, each remote station does not store successively entered characters and compose them into an integrated message, or into a word or multiple-digit number. Instead, each character is transmitted during its own unique time slot into the computer at the central processing unit, and the character is then entered by the computer into a circulating message register which is located at the central unit but associated with and serving only one remote station. Each time a new character is received at the computer from a remote station during the slot in which the latter is polled, the character is used to update the particular portion of the message contained in the associated message register to which that character relates. Thus, over a period of a few time slot cycles, the complete message contained within the associated message register at the central unit becomes updated through the efforts of the computer which processes the individual input characters, extracts the circulating message from the message register, updates it according to the latest character received, and then inserts it into the register again so that it can continue circulating therein and continue being transmitted to the associated remote station once during every time slot in each cycle of slots.

Another important object of the invention is to provide a system which uses time-sharing display means at each of the remote stations which can be refreshed periodically by the messages being transmitted thereto during each time slot. This display system at each register in the illustrative embodiment includes special Nixie tubes which can operate on a 5 percent duty cycle and whose anodes can be commutated to provide movement at a high rate from one digit which one Nixie tube is displaying to the next adjacent digit to be displayed by an adjacent tube. The display data being read out during each time slot arrives in the form of serial bits at the local station, and is divided into characters and then displayed on-the-fly as the information is received. Thus, all Nixie display tubes in all stations are refreshed during each time slot regardless of which remote station is being polled to transmit its input information to the computer during that time slot.

Another object of the present invention is to provide means at each remote station for adding a parity bit to each input information transmission, and cooperative means at the central executive unit for checking parity to verify correct transmission of the information group. The system further includes means for preventing the multiplexing system in the executive unit from moving ahead to select the next remote station if the transmission from the last station failed the parity check, and then for causing the last station to repeat its transmission during the next adjacent time slot unit a satisfactory parity check is obtained.

Another object of the invention is to provide a system of the type set forth above which uses a relatively simple computer in the central processing unit, which computer is capable of servicing a fair number of remote stations such as might be found in a department store. The system is easily expandable to increase the number of remote stations which can be served, and also to cooperate with similar systems in other branches of a store, perhaps by using the facilities of a major central computer system. The present system includes a credit file, a memory file which retains unit prices of all items, filed by item number, an inventory memory for maintaining current inventory, and perhaps suitable tax, cash, and current sales memories. These particular features of the computer are found in many systems used for similar purposes and are not therefore urged as novel in this specification.

Another advantage of the present system is that it performs all of its functions "on line," and therefore management can access the information currently contained within the system at any time.

Other objects and advantages of the invention will become apparent during the following discussion of the drawings, wherein.

GENERAL DESCRIPTION OF SYSTEM

Figure 1:
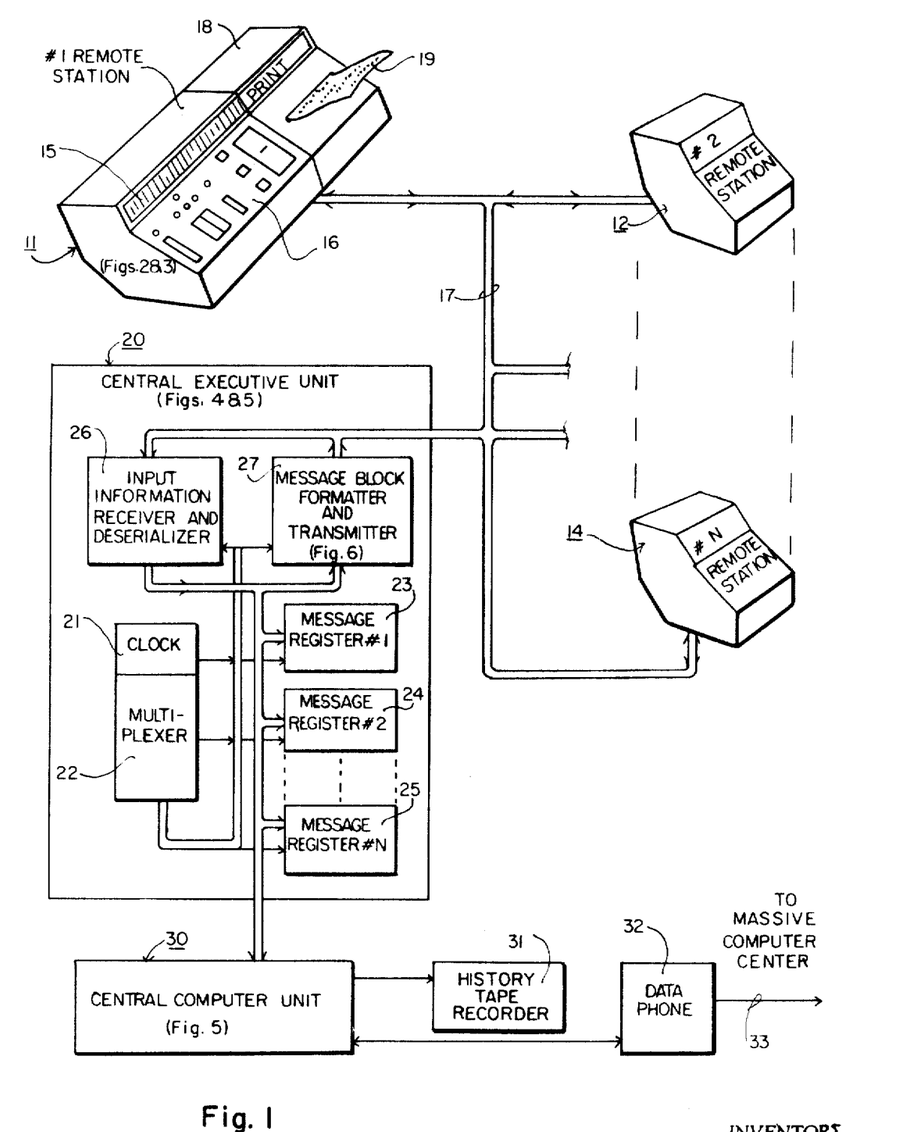
FIG. 1 is a diagram showing an embodiment of the present invention in terms of its major units.

Referring now to FIG. 1, a typical system includes a plurality of remote stations 11, 12, ... 14, any number of remote stations being serviceable by suitable central unit equipment in this system. These remote stations each include a display 15 comprising a row of indicating devices such as I.E.E. lighted displays or Nixie tubes, the latter being used in the present example. Each of these illustrative remote stations also includes a keyboard 16, which is shown in greater detail in FIG. 2, and further includes means for transmitting program information and data over a data link 17 to a central unit including an executive unit 20 and a computer unit 30 which will be discussed hereinafter. The central executive unit 20 includes a receiver 26 for receiving remotely transmitted information, but it is also includes transmitter means 27 for returning messages from the computer via the data link 17 to the remote stations for purposes of control of the remote station as to its mode of present operation and for the purpose of display of centrally processed and composed data at the display units 15. Each remote unit therefore also includes means for receiving and decoding messages returned to it from the central executive unit 20.

At the central location the executive unit 20 and a computer 30 cooperate with each other to service all of the remote stations 11,12,...14, to which they are connected by the data links 17. Although the system can be used to perform a wide variety of functions, the present disclosure is illustrated by an embodiment in the form of a sales-point cash and inventory system such as might be used in a department store. In order to simplify the remote stations 11,12,...14 as much as possible, a great deal of the complexity characterizing prior art system remote units has been removed from them and has been placed in the central executive unit 20 thereby leaving the remote stations essentially with only keyboard means, display means, and a minimum of information handling components necessary to transfer data between the remote stations and a central location through simple twisted pairs of data link wires.

The computer 30 at the central location may be a relatively small computer which is specifically programmed to perform the sales-point functions to be described hereinafter. The computer includes a program by which the system operates, and is connected by suitable data and control lines to the central executive unit 20 which performs several different functions. The central executive unit includes separate message composing registers each of which is permanently associated with one of the remote stations, these registers containing the data being displayed at the present moment at the associated remote station, but also serving to compose all data messages which are transferred thereto from the computer after the latter has processed new input from the associated remote station, which data is fed to it one character at a time on a time-sharing basis with the other remote stations in the system. The central executive unit 20 includes a clock 21 driving a multiplexer 22. The multiplexer polls the remote stations in sequence one at a time on a separate time-slot basis, each time-slot being of sufficient duration to transfer multiple-bits including one character of input information and/or one program command from the polled remote station to the computer, which uses that character to change one digit in the message register associated with that particular station and uses the program information to tell it what to do.

However, the polling reoccurs at such a high rate that the updating of the message composed in the associated message register and displayed during every time slot at the associated remote unit appears to be continuous to the eye even though only one digit is updated during each time slot. When a time slot corresponding with that remote station runs out, then the time slot assigned to the next station to be polled comes into operation and enables the latter station to transmit a one-character message to the computer together with a command to the computer to update the message register associated with that remote station. After one complete cycle of time slots has transpired, the multiplexer at the central executive unit 20 repeats the polling cycle and updates other digits in whatever message composing registers happen, during that time cycle, to be associated with remote stations having input information to send. From time to time the message composing register associated with a particular remote station arrives at a stable condition, for instance while it is awaiting the entry of further data from the remote station operator, and even during these intervals the message appearing in the register associated with that particular remote station is still read out to the display 15 in the associated remote station once during every successive time slot, whereby the data displayed at all of the registers is continuously refreshed during each slot regardless of whether or not any changes in content have been made. When a transaction has been completed, the remote station is reset and its associated message register in the central executive unit is also reset. The present system shows a message register 23 associated with the 01 remote station 11, a message register 24 associated with the 02 remote station 12, and a message register 25 associated with the 0N remote station labeled 14 in FIG. 1.

The information coming from a remote station to the computer via the data link 17 may include a single character, for instance a 4-bit information group serially transmitted on a modulated carrier over the data link wires. Alternatively, there may be transmitted program instruction information serially modulated on the carrier as a 7-bit group, or else both types of information may be transmitted in the same time slot. Conversely, different twisted pairs in the data link 17 carry messages of the format shown in FIG. 6 from the central executive unit 20 to each of the remote stations. This message format 40 includes a synchronization signal subblock 41 by which all remote stations are informed as to the beginning at line 46 of a new time slot; a 5-bit transmit enable signal subblock 42 by which a particular remote station is informed that it is being polled and that it should send its information group to the central executive unit 20; and a 5-bit mode signal subblock 43 indicating the mode of operation in which the associated remote station should now be functioning, such mode being determined by the computer using knowledge of prior events to indicate to the remote station the function that it should perform next, or be currently performing. The message block 40 further includes a 72-bit subblock 44 which comprises an entire display message for a particular remote station which in the present example includes 18 characters of 4-bits each, operative during every time slot to refresh the display 15 at the associated remote station; and further includes a 4-bit subblock 45 containing one character to operate the associated remote station printer so that it can print out slips 19 corresponding with the information shown in its display unit 15. The printer 18 may comprise either an integral part of the remote station 15, or it may comprise a peripheral unit to be attached thereto. In any event it will print out a paper sales slip 19 similar to that printed by an ordinary cash register, and its characters are printed as commanded by the central unit one character per time slot by solenoids within the printer 18 which is a purchased item, the printing being accomplished character-by-character during successive time slots whenever printing at that particular remote station is appropriate and commanded by the central unit.

In addition, at the central location there may be included a history recorder 31, for instance useful in making audit tapes, and a dataphone 32 which can be connected by an ordinary telephone line 33 to a massive-memory computer center at which time would be shared with other systems of the type illustrated in the present example.

It is assumed that the present computer will be of sufficient capability to perform ordinary mathematical steps such as addition, subtraction, taxing, etc., and to store data, perhaps department by department, showing cash on hand, gross sales, inventory, etc. One important feature of the present system is that the computer stores the prices of the inventory items, and the operators or clerks at the remote stations merely insert inventory stock numbers when entering sales at their remote station keyboards, the computer then returning price information concerning the items so entered and showing it at the remote display 15.

Another peripheral unit for the computer, besides the history tape recorder 31 and the data phone 32 might include customer credit files for "lookup" purposes. The modulated data link system used in working embodiments of present system makes it possible for the remote stations to be located at distances up to about 5,000 cable feet from the central location.

TRANSFER OF MESSAGES TO REMOTE LOCATIONS

The central location and the remote stations at the various sales points within a store exchange information via data link 17 synchronously with the sequence of time slots as determined by the clock 21 in the central executive unit 20. The central location simultaneously transmits blocks of data to all of the remote stations, and any particular data block may have its content updated by newly processed information fed into the computer if the station associated therewith is being polled during the current time slot. The receiving portion of each remote station includes sufficient equipment to receive and demodulate the serial data of the incoming message block and to decode incoming mode information. As mentioned above, the data appears in the form of serial bits divided during each time slot into subblocks, FIG. 6, which when decoded in the remote station contain parallel bits of information. The display data is displayed on-the-fly, but the mode information is temporarily stored until it is replaced with different mode information generated in the computer as an indication to the remote station of a change of the point in the overall computer program at which the system is presently operating with respect to that particular remote station. This mode information serves to sequentially illuminate a series of instruction indicators informing the operator at the remote station as to which function he should perform next on this keyboard. Some of the mode information also serves to automatically interlock the keys so as to definitely prevent out-of-sequence operation. The message block sent to each remote station also includes Nixie tube readout information whose digits are displayed immediately as they arrive, without storage. In addition, a final subblock of the message format when decoded actuates printer solenoid means for the printing of ordinary cash-register type sales tickets for the customer. The remote stations include no calculation capability and no data storage, but depend entirely upon cooperation with units at the central location to perform their functions.

The remote stations initiate information at their keyboards, or at a punchcard reader or some other input device, and this information includes a data digit or a command signal, or both, such a command signal informing the computer as to what is to be done with that particular digit or at that particular instant in the overall program. This information is never composed into a message at the remote station, and is not stored at the keyboard beyond the slight degree of storage which occurs incident to the forming of a single command or data character which can then be transmitted to the computer during the next polled time slot via the central executive unit 20 over the data link 17. Each such character is held at the remote station until the latter is polled by the central unit which delivers a clear-to-send signal as part of the message block being sent during the particular time slot selected by the central unit for polling that particular remote station. When a clear-to-send signal enables the remote station's transmitter, the encoded character including a data digit and/or a program instruction is then serialized and sent to the central location. The data included in the digit is then demodulated at the central executive unit 20 and its bits are accumulated in an input register for subsequent presentation to the computer at its input bus lines together with a locally generated signal activating the computer to perform the next function in its program. The computer performs the function and then recalls from the message composing register 23 associated with that same remote station the circulating data which it had placed therein as a result of previous data processing for that same remote station. The computer proceeds to update the content of the message which it just recalled from the associated register, and then returns the revised message to the same circulating register. Thereafter, the register sends the revised message to the remote station for display during each succeeding time slot until the message is again revised the next time the remote station is polled to transmit another character. The displays at the Nixie display tubes 15 of each remote station are refreshed during every time slot. However only the message being displayed at one remote station is altered during any time slot, and each of the others is merely repeated over and over again until its associated remote station is polled and provides a new character in response to which the computer will perform a further revision of the message content.

In view of the binary nature of the information being transferred both ways between the central location and each of the remote stations, it was found desirable to use a modulated carrier for the messages being transmitted through the data link in view of the fact that pulses would not travel over an inexpensive twisted pair for any considerable distance without having the pulse wave form lose its sharpness. The minimum usable data rate between the central executive unit 20 and the remote stations is determined by the requirements of the Nixie tube displays at the remote units. On a time sharing basis, these Nixie tubes have to be refreshed at the rate of approximately 100 Hz. It was found that a carrier modulated with 100 microsecond pulses would transmit their waveforms with fidelity. Two different carrier frequencies are used in order to minimize crosstalk. A frequency of 150 kHz. is used for data link transmissions in one direction and a carrier frequency of 250 kHz. for data link transmissions in the other direction.

A 10 kHz. clock rate drives the central executive unit 20, and it counts out 100 bits in a repeating cycle to measure the full length of a message delivered to a remote station and the full length of each time slot, each slot being of 10 milliseconds duration. The 100 bits of the message block 40, FIG. 6, which is delivered to the remote stations from the central executive unit includes as its final subblock 41 a synchronizing signal having 14 bits. The synchronizing signal is sent to all remote stations for the purpose to be hereinafter discussed and includes 13 binary ones followed by a binary zero, synchronization of the remote units occurring upon arrival of the binary zero at line 46 which marks the boundary between time slots. At the beginning of the next time slot the first subblock 42 includes 5-bits serving to enable and poll the keyboard at one of the remote stations. This signal acts as a clear-to-send signal sent to a remote station, and enables it to transmit its information to the central location. In other words, strobing of the remotes is accomplished during successive time slots by this subblock 42 sent out as a 5-bit encoded signal in the first subblock of the basic message.

Figure 6:
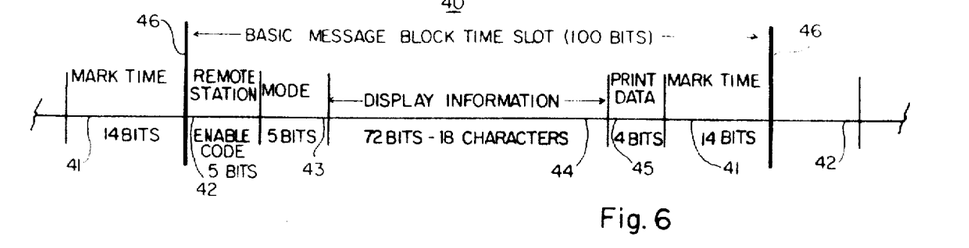
FIG. 6 is a diagram showing a typical message block composed for transmission to a remote unit.

The second subblock 43 of the basic message includes 5-bits indicating the "mode" of operation currently under way with respect to the particular remote station to which the message block is being sent. Note that the various remote stations can all be operating simultaneously in different modes at any particular moment of time. The third subblock 44 includes 72 bits representing 18 4-bit characters. These 18 characters respectively drive the 18 Nixie tubes comprising the display 15 in the associated remote station so that once during each time slot all Nixie displays are refreshed, i.e. once every 10 milliseconds. The next portion of the 100-bit message block 40 includes a 4-bit subblock 45 serving to actuate one solenoid of the printer 18 for the purpose of printing a digit of the display message on the paper tape 19 at the remote station, this message comprising a sales slip of the transaction involving that particular customer.

Each information group transmitted to the central executive unit 20 from a polled remote station is 12bits in duration and may include either a 4-bit encoded data character or a 7-bit encoded program command, or both, and one bit for adding odd parity. This format will be further discussed hereinafter to show how it is derived and how it is transmitted to the central unit once during a complete time cycle, and during the particular slot of the cycle when that remote station is enabled is subblock 42 of the message block 40.

REMOTE STATION MESSAGE RECEPTION AND SORTING

Near the lower right hand corner of FIG. 3, a message of the type illustrated and described in connection with FIG. 6 is received on the wire 50 which comprises one of the data link lines 17 shown in FIG. 1. This message, a modulated RF serial encoded message, is detected in the receiver 51 of the 01 remote station 11, and a series of binary pulses is then delivered on the wire 52. Other messages are delivered on the data link wires 50a and 50b to the other remote stations 12 and 14 at the same time. Each remote station has a time clock including a crystal oscillator 54 which has sufficient stability to maintain synchronization with the central multiplexer clock source 120 shown in FIG. 4, provided the remote clock is frequently synchronized. As can be seen in FIG. 6, the 14-bits of the subblock 41 comprise synchronizing information which is fed to a detector 53 in FIG. 3 comprising a logic circuit for detecting 13 consecutive ones. These binary ones are followed by a 14 bit comprising a binary zero, and when this occurs an output appears on wire 53a and serves to reset the 10 kHz. oscillator 54 and the counter 55 which it drives by way of the wire 54a. The remote clock comprising this source and counter is the same as the multiplexer clock source 120 and counter 121 shown in FIG. 4, and the purpose of the circuitry just recited is to keep the former in step with the latter by synchronization one every time slot.

The 10 kHz. clock oscillator 54 pulses the 100 step counter 55, and this produces an output from the step logic decoder 56 on the wire 56a at the same time that the remote station enable subblock 42 of the message block shown in FIG. 6 is just beginning. This output on wire 56a in FIG. 3 activates the enable register 57. The next 5-bits are sequenced into the register 57 from the wire 52 as the message arrives on the data link wire 50 and is demodulated by the receiver 51. These 5-bits which are deseriallized in the register 57 comprise the address of a remote station, and are then delivered in parallel to a hard-wired logic circuit 58 having the capability of detecting whether the 5-bit address comprises the address of the present remote station 01. If it does not, the detector 58 delivers an output signal on wire 58b which indicates that the station code was not its own. On the other hand, if it does comprise the correct station code for the 01 remote station, an output appears on the transmission enable wire 58a serving to indicate to this remote station that is being polled at the moment and that it should read out its own information corresponding to the particular key which at the moment is depressed on the keyboard 16 shown at the top of FIG. 2. This feature will be presently described.

By now, the 5 bits of the address subblock 42 shown in FIG. 6 have passed and the counter 55 has counted the step decoder 56 to remove the signal from the wire 56a and place it on the mode wire 56b. The enable register 57 is therefore disabled, and the mode register 59 is enabled. At this point, the message appearing on the wire 50 begins serially reading in to the receiver 51 the 5 bits of the mode message subblock 43, and the demodulated mode information on wire 52 is deseriallized in the now-activated mode register 59. As mentioned hereinbefore, this mode message indicates the status quo as viewed by the computer 30, and serves to enable the next sequential step to be performed by the operator at the keyboard 16 in FIG. 2. This 5-bit parallel mode message is delivered on wires 59a for temporary storage in the decoder circuit 60, which then delivers on a bundle of wires 61 suitable hard-wired messages to certain instruction indicator lights on the keyboard 16, and to suitable keyboard sequence and interlock control circuits, which will be discussed hereinafter. Each message is stored in the circuit 60 and remains there until changed by the insertion of a different mode at some subsequent time when a different mode message appears on the wire 52.

By the time the fifth bit of the subblock 43 is concluded, the clock oscillator 54 has counted the step counter 55 to the point where the decoder signal on wire 56b disappears and the display wire 56c becomes enabled. This wire remains enabled during the next 72 bits of information serially read into the receiver 51 along the message wire 50. As pointed out above, these 72 display bits represent 18 4-bit characters, and it is the purpose of the counter 62 to divide these 72 bits into 4-bit digits occurring on the fly one after another and representing the display characters. The output on wire 56c enables an AND gate 63 which then passes the pulses from the 10 kHz. clock 54 for counting up the counter 62. The output of the counter on wire 62a latches each four display bits into the 4-bit latch 67, and also drives a Nixie tube anode selector circuit 64 so as to step from one anode to the next along the 18 Nixie tubes in the display 15 each time the counter 62 has counted out the 4-bits of another display character. In the meanwhile, the 4-bits are counted into the 4-bit display register 65 which is also enabled by the output on the wire 56c, and the register 65 converts every group of four serial bits into a 4-bit parallel output on the wires 66. This 4-bit output is delivered to the 4bit latch 67, latched in by the signal on wire 62a, and then delivered to the gate 72 and to the cathode decoder circuit 68 which uses the 4-bits of information to select one of the 10 available Nixie tube cathodes representing displayable numerals 0 through 9. All similar cathodes of all 18 Nixie tubes are wired in parallel so that the selection of each 4-bits designated a particular displayable numeral actually designates all such Nixie tube cathodes. However, only the Nixie tube lights up whose anode is simultaneously selected by the circuit 64. In this way, the 18 characters are selected consecutively using the selector circuit 64 to sequentially step from anode to anode and using the cathode decoder 68 and the 4-bit latch 67 to energize the appropriate cathode selected numeral. The display 15 uses special Nixie tubes, i.e. Burroughs Corporation type B5855 which are specially made for strobing or time sharing application and can successfully operate upon a 5 percent duty cycle. The cathode decoder and driver 68 (Ser. No. 7441 AN, of Texas Instrument Co.) is specifically designed to drive Nixie tubes, and the anode-strobing circuit is fully described in Burroughs Corp. Bulletin 01144, published Aug. 15, 1968, and therefore is believed to require no further elaboration.

The display data is received serially on the wire 50, decoded, and delivered character-by-character 4-bits at a time to the latch 67 and cathode decoder 68. Since all of the 18 Nixie tubes may not be used in any particular moment, it is desirable to suppress nonsignificant zeros in the display. This can be done by disabling the selection of certain Nixie tube anodes by failing to apply an enabling signal from flip-flop 70 via the wire 70a. Since the Nixie tubes are actually energized sequentially one at a time, zero-suppression is accomplished by not enabling the anode selector 64 to have an output on one of the wires 74 until a number other than a zero appears in the 4-bit latch 67, commencing each time with the most significant digit. Beginning with a new message block, FIG. 6, a reset signal appears on wire 53a and resets, inter alia, the flip-flop 70 via the OR gate 71a, the character counter decoder 71, and the 4 counter 62. Since the flip-flop 70 is reset there is no enable signal on wire 70a. The AND gate 72 is connected to the inverted outputs of the 4-bit latch 67. Therefore, when four zeros are present in the latch, the output of AND gate 72 is active and the output of the inverter 72a is inactive. If anything except four zeros is present in latch 67, meaning that there is a significant first character, then the output of AND gate 72 is inactive and the inverter 72a is active so that the signal on wire 62a will set the flip-flop 70 via AND gate 73. The display is therefore enabled until flip-flop 70 is again reset via OR gate 71a. If the first character in display 15 is a nonsignificant zero, it will be blanked because the flip-flop 70 is not set until the signal on wire 62a marks the beginning of character 02, which is a nonzero department designation. The display is again blanked by an output on wire 62a marking the end of character 02 and counting the counter 71 to have an output on wire 71b which resets the flip-flop 70 via OR gate 71a. The display remains blanked until the next significant character occurs. For instance, it may remain blocked through characters 03, 04, 05, and 06 if these are all zeros. Character 07, being a nonzero, enables the gate 73 through the gate 72 and sets flip-flop 70 to enable the display until after character 011, at which point it is again blanked by an output on wire 71c acting through OR gate 71a. If characters 012, 013, 014 and 015 are nonsignificant zeros, they are blanked until character 016 sets flip-flop 70 via gate 72. The display message block is concluded, and the flip-flop 70 remains set, but it will be reset by the next reset signal on wire 53a via OR gate 71a during the next succeeding message block.

When the 18 character has been displayed and the 72bits of the subblock 44 have run out, the 10 kHz. oscillator 54 has just counted the counter 55 to the point where the decoder output disappears from the wire 56c and moves to the wire 56d, thereby disabling the display register 65 and enabling the printer register 69. The register 69 deseriallizes the 4 bits contained in the message subblock 45 and delivers them on the wires 69a to the printer 18 which then prints a single character upon the tape 19. The end of the message block 40 is signalled by the subblock 41 in FIG. 6, and the output of the receiver 51 immediately includes a series of 13 consecutive binary ones which are detected in the sync detector 53. As mentioned above, when the detector 53 detects the zero which follows the 13 ones it delivers an output on the reset wire 53a to reset the 10 kHz. clock and the counters 62 and 70.

TRANSFER OF KEYBOARD INFORMATION TO COMPUTER

The preceding section of this specification described the manner of operation of the message display 15, the synchronizing of the timing clock at the remote station, and the method of indicating to the remote station whether it is being polled during a particular time slot, whereby an enabling signal appears on the wire 58a if that particular remote station is being polled. The enable signal travels to the left on wire 58a and enters FIG. 2 just above the center of its right edge.

Figure 2:
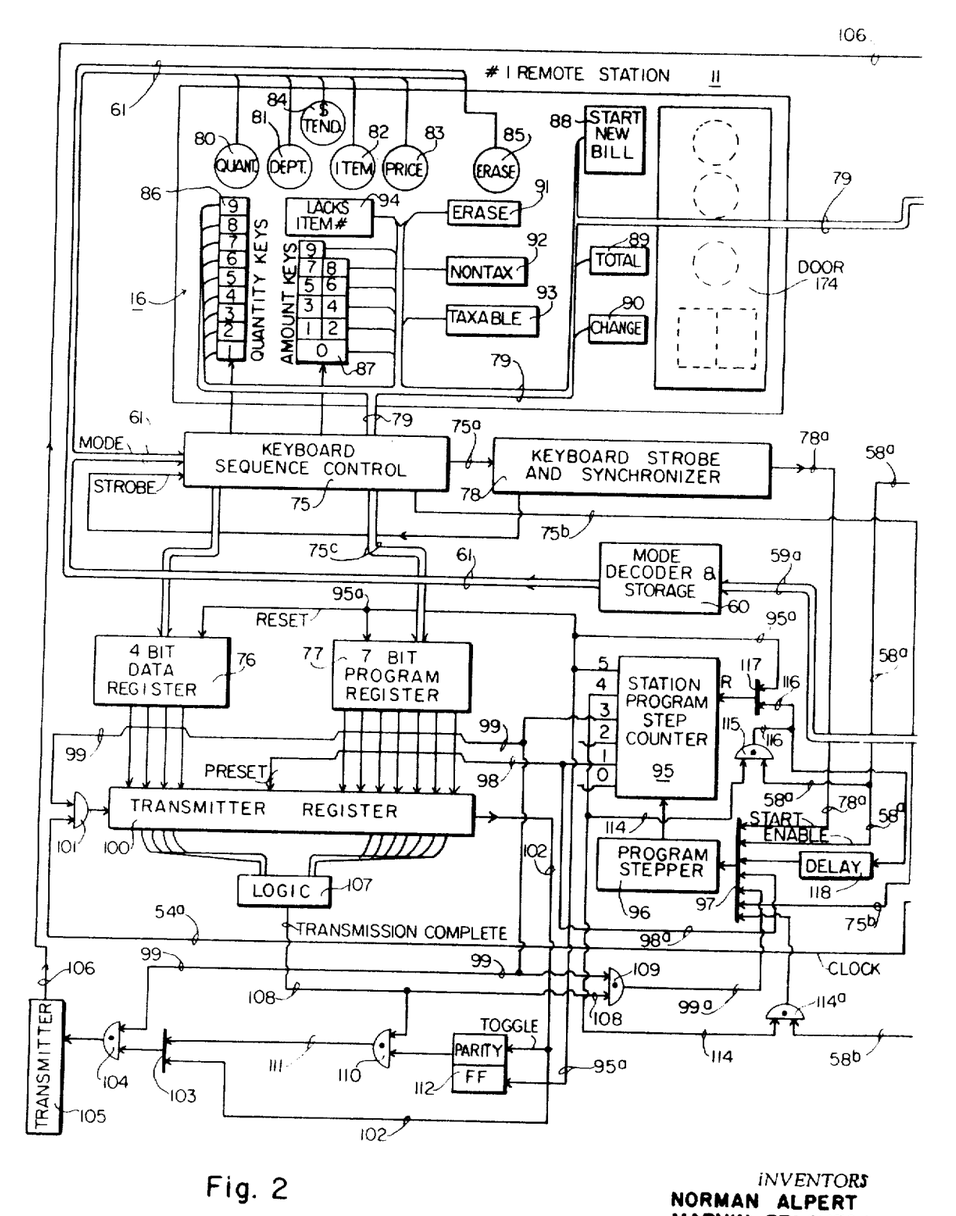
FIGS. 2, 3, 4, and 5, when placed side by side form a more detailed composite block diagram showing the interconnection of components forming a working embodiment of the present invention.

The keyboard 16 of the 01 remote station is shown at the top of FIG. 2, and includes essentially three different kinds of devices. The circles across the top of the keyboard represent lighted indicia which when illuminated serve as instructions to the operator to inform him as to what transaction entry steps he should take next. These indicia are lighted by the output wires in the cable group 61 from the 5-bit mode decoder 60, and include an "enter quantity" light 80, an "enter department" light 81, an "enter item number" light 82, an "enter price" light 83, an "enter amount tendered" light 84, and an "erase" light 85.

The keyboard 16 includes two decimal key groupings including a quantity-key grouping 86 having keys labeled 1 through 9, and an amount-key grouping 87 having keys zero through 9.

The keyboard also includes certain program command keys by which the operator can tell the computer what to do. These keys include a "start new bill" key 88, a "total" key 89, a "change" key 90, an "erase" key 91, a "nontaxable" item key 92, a "taxable" item key 93, and a "lacks item number" key 94.

These command keys and the decimal quantity and amount key groupings labeled 86 and 87 are all connected to a keyboard sequence control circuit 75 which accomplishes two basic purposes. In the first place, it receives mode information from the group of wires 61 and interlocks the various keys on the keyboard with the functions being performed by the computer so as to prevent undesirable out-of-sequence manual operation. It accomplishes this purpose by enabling the various keys on the keyboard selectively. For example, the keyboard sequence control circuit 75 prevents the operator from depressing the "change" key until an "amount tendered" has been entered into the system. The other function performed by the keyboard sequence control 75 involves the strobing of the keys of the keyboard to extract from them binary encoded characters which each is capable of generating when it is depressed, assuming that it has been enabled by the keyboard sequence control circuit 75. Actually, there are two different types of information characters which can be generated at the keyboard, namely digital data which can be generated and inserted into a 4-bit data register 76, and various program commands which can also be generated by depressing a key on the keyboard, which programs are then entered into a 7-bit program register 77. Depressing a key generates the information bits in parallel. Whenever a key is depressed the keyboard strobe synchronizer 78 generates a strobing signal after a settling time sufficient to eliminate contact bounce which signal sets the bits into registers 76 and 77, i.e. data being set into register 76 and program information into register 77.

There are certain locally programmed steps through which the remote station, FIG. 2, must proceed each time an information signal is generated by the depressing of a key on the keyboard 16. There are five steps in such a program, and these steps are selectively commanded by the station program step counter 95, which counter is not driven synchronously with the time slots or the clock 54, FIG. 3. Instead, the next program step is called for each time the previous step is completed, and for this purpose a stepper 96 is provided which issues a pulse whenever an input signal appears at OR gate 97. The first step at the output of the counter 95 is labeled zero, and this is the step to which the counter initially resets and at which it awaits further developments, thus, considering that the counter 95 is initially resting on step zero, when an operator wishes to commence using the keyboard at the 01 remote station 11, he depresses the "start new bill" key 88, and this initiates a signal which travels from the key 88 through the bundle of wire 75a to the keyboard synchronizer 78 which issues a pulse on the wire 78a, this pulse travelling through the OR gate 97 and causing the stepper 96 to advance the program counter 95 to the program step number 01. In this position, an output is delivered on wire 98 to preset its stages to receive whatever bits may be contained in the register 76 and the register 77. Thus, the information generated by depressing a key on the keyboard is now preset into the transmitter shift register 100, but an output on the wire 98a also passes through the OR gate 97 and causes the counter 95 to proceed to program step 2. There is no output at step number 02, and therefore the system awaits further developments. As time goes by, the central executive unit 20 passes through a sequence of time slots in which it polls other remote stations than the 01 remote station 11 shown in FIG. 2. Eventually, when the number 01 station is to be polled, its station code will be read into the shift register 57 and detected by the address circuit 58, and an output will appear on the wire 58a indicating that remote station number 01 is enabled to transmit its bits appearing in the transmitter register 100 to the central station for processing. Thus, an input to the OR gate 97 via wire 58a steps the program counter 95 to step number 03, thereby providing output on wire 99. One effect of the output on wire 99 is to enable the AND gate 101 and thereby permit the 10 kHz. clock pulses on the wire 54a to step the shift register 100 and begin delivering output signals on wire 102, which output signals pass through the OR gate 103 and the presently enabled AND gate 104 to the transmitter 105 which modulates these pulses onto a carrier wave, which is locally generated, and transmits them on wire 106 which is part of the data link 17 to the input of the receiver 126 at the central unit shown at the top of FIG. 4, as will be described hereinafter. Thus, a series of bits is read out of the transmitter register 100 depending on what is contained in it, and the transmission of these outputs causes a series of 11 bits to appear serially in the logic circuit 107 which delivers an output on wire 108 as soon as 11 shifts have occurred at the transmitter register 100 to indicate that the transmission of information is now complete. The combination of the end of the 11th output as signalled on wire 108 and the enabling signal on wire 99 activates the AND gate 109 to deliver a signal on wire 99a through the OR gate 97 to the program stepper 96 to cause it to advance to step number 04. In addition, the output on wire 108 enables an AND gate 110 to provide an output on wire 111 if the parity flip-flop 112 has been toggled to a position indicating an even total number of binary ones contained in the 11 bits transferred from the transmitter register 100 via the wire 102. Each output of a binary one on the wire 102 toggles the parity flip-flop 112. After the 11 bits have been read out from the transmitter register 100, if the parity flip-flop has been left in an "even number of ones" position, an output will occur on wire 111 to add a binary one through the OR gate 103 and the AND gate 104 to add a parity "one" bit to the output of the transmitter 105. Thus, odd parity is automatically transmitted by this system.

The system now pauses on program step 04, and at this point one of two possibilities can occur. Either the message just transmitted on the wire 106 to the central station was properly received, meaning that odd parity was preserved as determined at the central unit, or else the message was not received with correct parity. The way the remote station determines the difference between these two conditions is that if the message was not properly received the central unit shown in FIG. 4 will again transmit the same remote station's address code during the next time slot as part of the message appearing on wire 50, and therefore the same remote station will be called upon to immediately repeat its message, as will be described hereinafter. Thus, the system doesn't poll another station when the present station has failed to properly transmit its information, and the latter is now given another chance during the next succeeding time slot. More precisely, in program step number 04 there is an output on wire 114 which enables an AND gate 115 at one input as well as AND gate 114a at one of its inputs. If during step 04 the just-accomplished transmission was not properly received at the central station and therefore an output appears again on wire 58a, the gate 115 will deliver a signal on wire 116 which will pass through the OR gate 117 to reset the step counter to step zero. Output on wire 116 also passes through the delay 118 and the OR gate 97 and pulses the program stepper 96 to subsequently advance the step counter 95 to program step number 01. From here, the system proceeds again through the above-related steps of transferring the same keyboard character into the transmitter register 100 and then sending it through the transmitter 105 together with a parity bit to the central processing unit. If the retransmitted information is again incorrectly received, and fails the parity test, the process is again repeated going back to step 01 of the counter 95 and proceeding up to step 04 However, if the information was correctly received at the central unit this time, there will be a signal appearing on wire 58b. The gate 114a will therefore deliver a signal to OR gate 97 to step the program counter 95 to step 05. Parenthetically, it is realized that the system can hang up if it keeps polling a remote unit which is for some reason failing to deliver its message properly to the central unit. To avoid this occurrence, some means (not shown) is added in the practical system to cause it to go on to the next remote unit after it has unsuccessfully polled the preceding remote unit a predetermined number of times. Continuing with the program, in step 05 the output on wire 95a resets the storage registers 76 and 77, and also resets the station program step counter 95 through the OR gate 117, thereby returning the step counter to zero count where it remains dormant until the operator depresses another key. Naturally, the rate at which an operator can depress the various keys on the keyboard 16 is extremely slow as compared with the time slot cycle rate of 10 milliseconds. Therefore, each key when depressed will remain depressed during many successive polled time slots, or until its information is successfully transmitted to the central unit.

CENTRAL STATION UNITS

Figure 4:
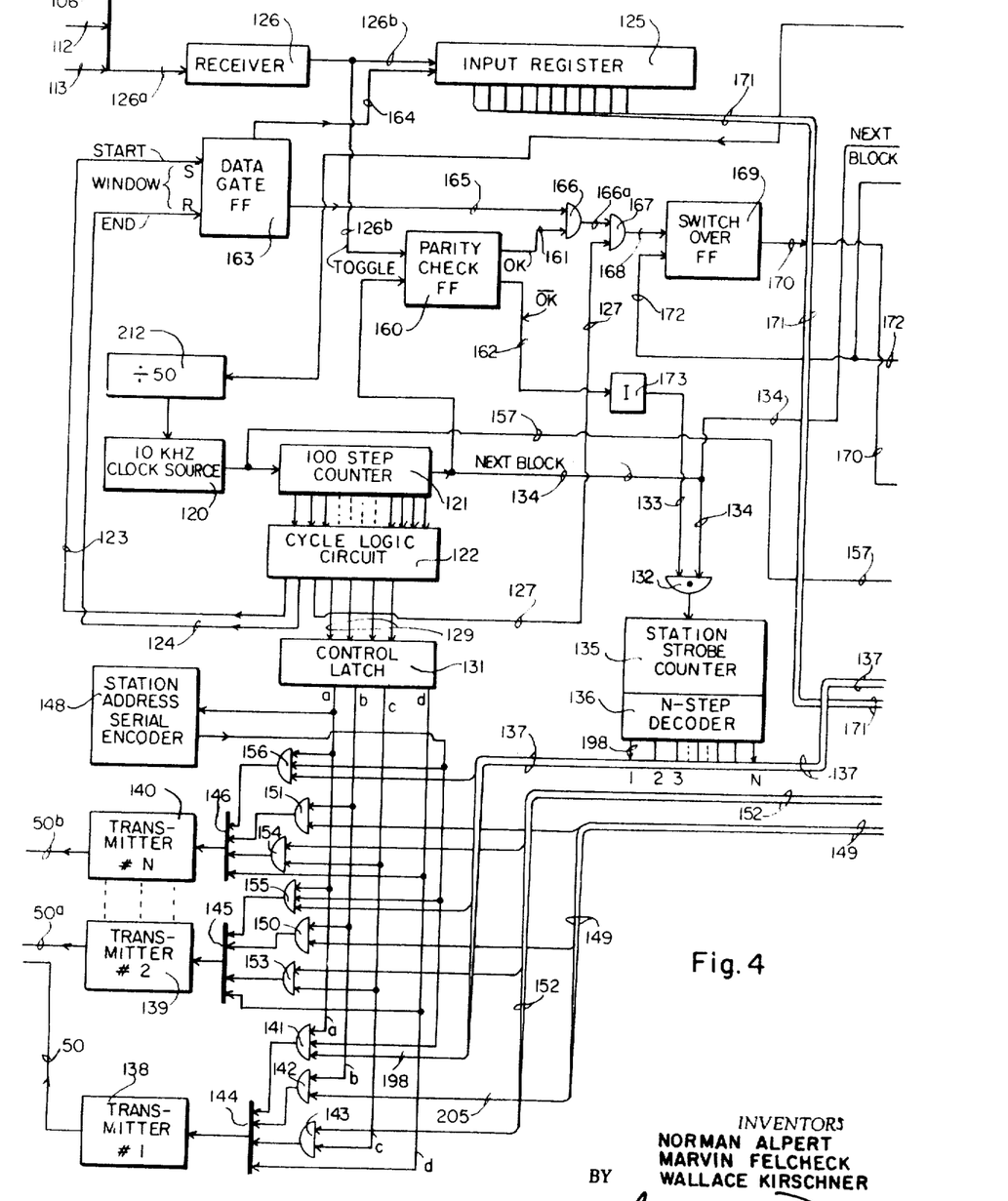
Figure 5:
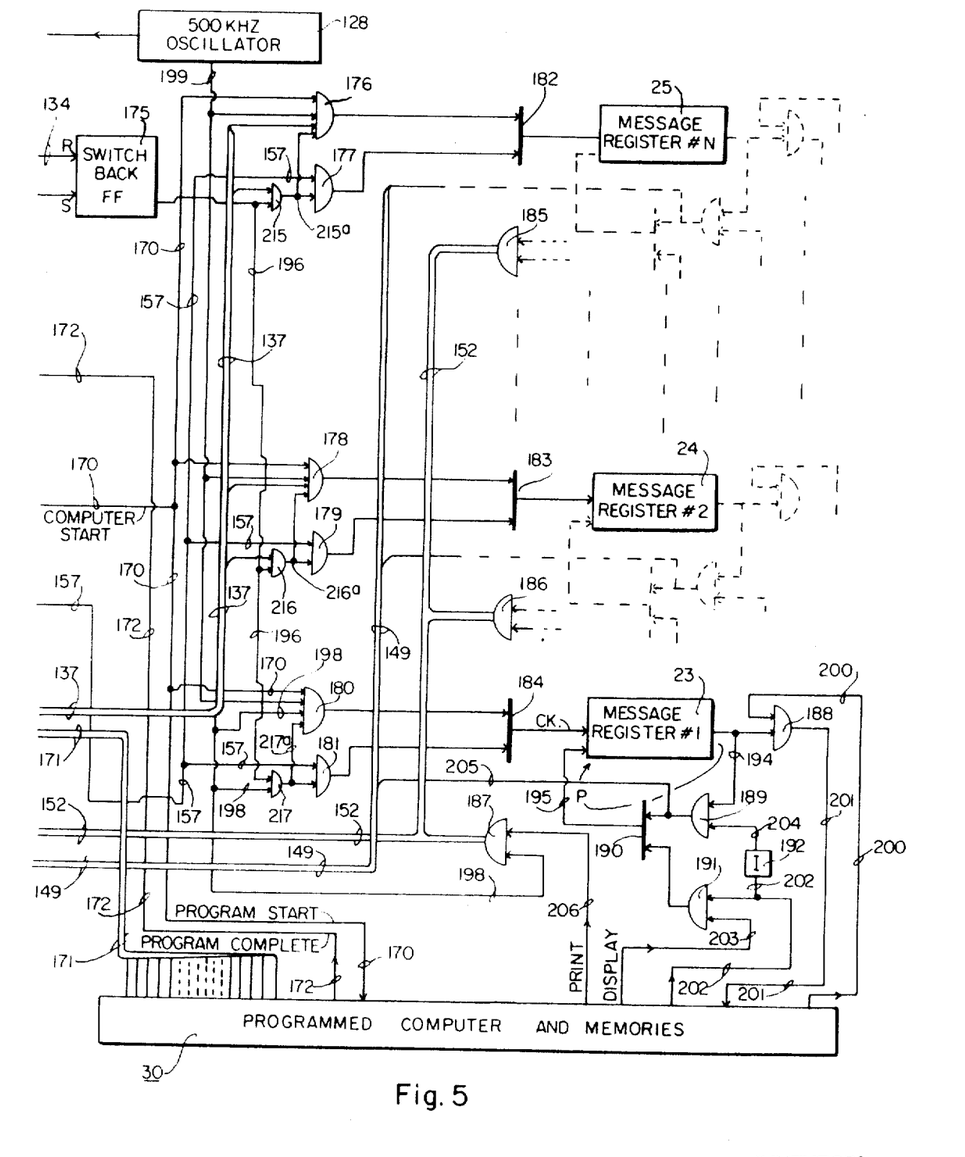

The central station executive unit 20 serves several important functions in the present system, and is shown in FIGS. 4 and 5. This executive unit includes multiplexer means so that a single computer can be shared by a number of remote stations. The multiplexer includes a time clock system and also means to synchronize similar remote time clocks in the various remote stations. The executive unit has means for receiving the input information from the remote keyboards appearing as serial amplitude-modulated signals and for converting them into a binary parallel signal which can be accepted by the computer 30. Moreover, the central executive unit cooperates with the computer in composing return messages to all of the remote stations, which messages are delivered by amplitude-modulated data links 17 at such a repetition rate as to continuously refresh the Nixie tube displays at all of the remote stations so rapidly as to prevent noticeable blinking of these displays. These return messages all differ in substance from each other and from remote station to remote station, but they are transmitted to the remote stations simultaneously. The central executive unit also checks incoming information from the remote stations for parity, and exchanges program information and mode messages between the various remote stations and the computer. A more detailed discussion of the performance of these functions follows.

Figure 3:
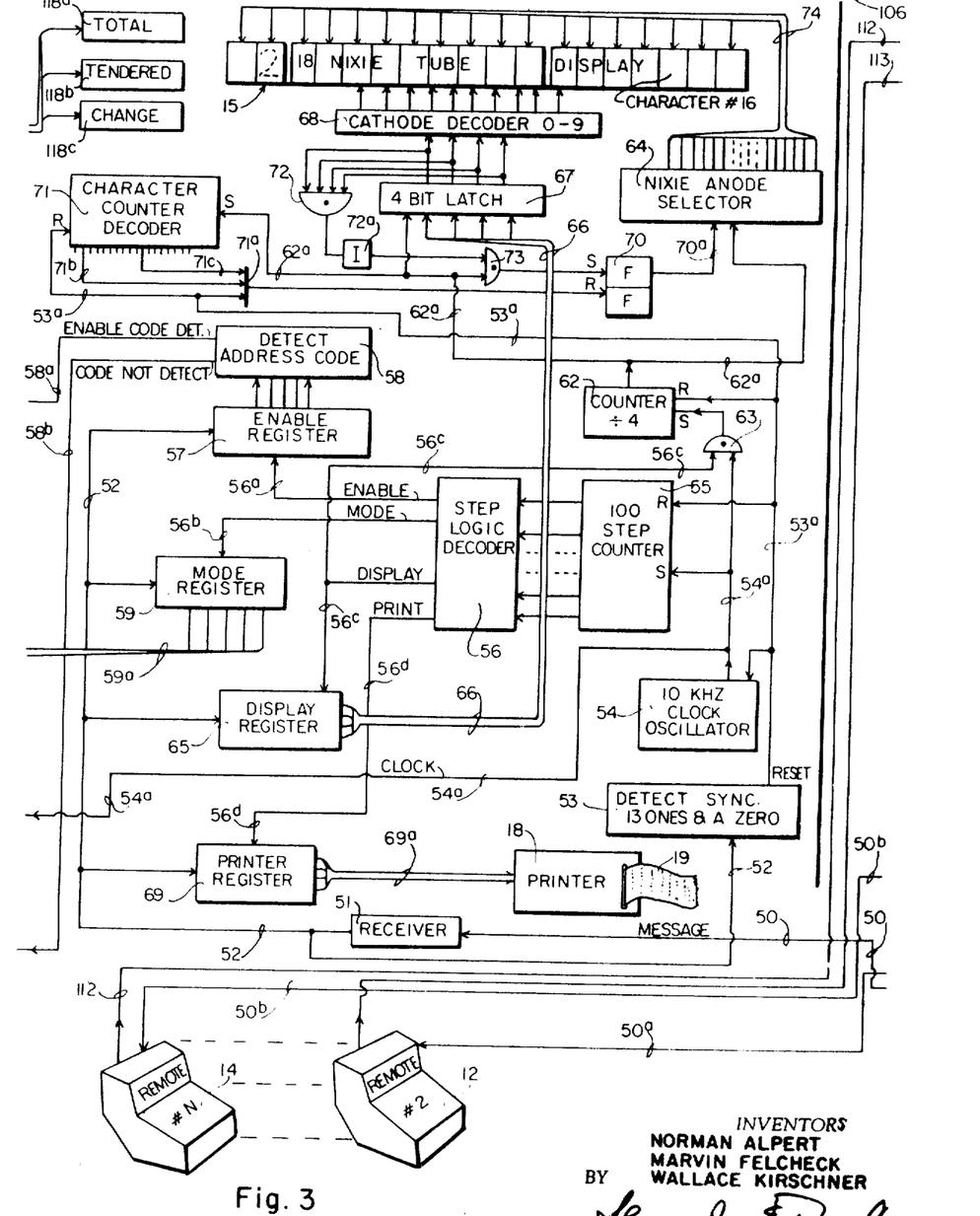

The time clock section of the executive unit includes a 10 kHz. clock pulse source 120 which is driven by the master oscillator 128 through a 50 counter 212 to obtain a 10 kHz. pulse rate to which all other oscillators, such as 54 in FIG. 3, are synchronized, and this source 120 drives a 100 step counter 121 whose count when completed marks the boundary between adjacent time slots. The time slot cycle itself is not of fixed duration. Although it is a recurring cycle including however many remote stations may exist, still any of the slot cycles can be stretched as a result of repeated consecutive pollings of one or more of the remote stations if some of their transmissions fail the parity check. The counter 121 in the middle of FIG. 4 divides each time slot into 100 parts corresponding with the 100 bits contained in each return message composed by the units at the bottom of FIG. 4 and transmitted via the message lines 50, 50a, and 50b to remote stations. The cycle logic circuit 122 accepts outputs from the counter 121 and derives from them pulses occurring at certain moments during their succession. There is a pair of pulses including a start pulse on wire 123 and an end pulse on wire 124 establishing a 12-bit window during which information can be gated into an input register 125 connected to the 01 remote station 30 via an input receiver and demodulator 126. The above mentioned window begins at the end of the remote station code block 42 of FIG. 6. There is another output labeled 127 which is a start point signal designed to change over the speed of a message register from the 10 kHz. clock rate at which this register is normally pulsed by the source 120, to a higher rate at which the register is shifted by a 500 kHz. oscillator 128, the latter rate of shift being used to pulse the register while the computer is cooperating with it to update the data circulating therein. In addition, the cycle logic circuit 122 delivers four other signals on wires 129 to a control latch 131 which at appropriate moments selects and holds a signal on one of 4 output wires, the output of the latch 131 shifting along the wires $a$, $b$, $c$, and $d$ in sequence in the manner to be hereinafter explained.

The message registers 23, 24, ... and 25 are shift registers, each associated permanently with one of the remote stations, and composing displays and other messages about to be read out to these respective remote stations. The register 23 is always associated with remote station number 01; the register 24 is always associated with remote station number 02; ... and the register number 25 is always associated with remote station 0N.

The clock source 120 and 100 step counter 121 commutate the stations, polling them one by one. The gate 132 is usually conductive because there is normally an enabling signal on the wire 133, as will be shown later. The 100th count of the counter 121 is delivered on wire 134 and passes through the gate 132 to advance the station strobe counter 135, normally through one step for each time slot and each complete data block of the type shown in FIG. 6. The output of the counter 135 is decoded by a decoder 136 which provides output steps 1, 2, ..., N, and these outputs are hard wired through the cable 137 to various gates in FIGS. 4 and 5, which serve the purpose of sequencing the various inputs and outputs passing through the executive unit 20. The executive unit will be understood more clearly from the following discussion of its structure and functions.

The output messages from the executive unit to the individual remote stations are composed by the series of gates appearing near the bottom of FIG. 4. Each group of three AND gates plus an OR gate provides an output message for driving one of the transmitters 138, 139, ... and 140. The transmitter 138 is associated with remote station number 01 and drives the message line 50 going thereto. The transmitter 139 is associated with remote station number 02 and drives the data link message line 50a going to it. The transmitter 140 drives the data link message line 50b which is associated with remote unit 0N. In addition, these other remote stations shown at the bottom of FIG. 3 include data link input information lines 112 and 113 going to the input line 126a to the receiver 126.

In view of the fact that all of the remote stations are substantially the same, the present description will describe in detail only the three AND gates 141, 142, 143 and the OR gate 144 connected to the transmitter 138, the other two groups of gates above these gates being wired the same and serving similar purposes in associated with different remote stations. These gates operate to sequence centrally available data in such a way that serially transmitted bits occur in the form of the message block shown in FIG. 6 to be applied to the message line 50. The message sequence is accomplished by the 100 step counter 121 and the cycle logic circuit 122, which are driven by the 10 kHz. source 120.

The basic data transmission block shown in FIG. 6 is formed by having an output signal at the "ones" level appear on wire $d$ from the control latch 131 and remain at the ones level for 13 counts. This signal then changes to the zero level on the 14th step of the counter 121 and thereby provides the zero time mark signal at line 46 in FIG. 6, the signal passing through the OR gate 144 into the transmitter 138. In view of the fact that this mark signal is common to all remote stations and is sent to all of them simultaneously, the output on wire $d$ from the latch 131 is applied to all other OR gates including 145 and 146 so that the mark-time synchronizing signals will be sent out simultaneously by all the other transmitters 139, and 140 associated with the other remote stations 12, ... and 14 shown at the bottom of FIG. 3.

When the mark signal on wire $d$ has experienced the 14th count of the counter 121, its output disappears and an output appears on wire $a$ which enables one input to each of the uppermost gates, such as an AND gates 141, 155 and 156. The wire $a$ remains energized for the next five counts of the step counter 121. The gates 141, 155, ... and 156 respectively have another one of their inputs attached to a station address serial encoder 148 which delivers the 5-bit serial encoded address of a station, which appears in subblock 42 of FIG. 6 by which the station to be enabled during that time slot is enabled. However, the third wire attached to each of the gates 141, 155, ... and 156 is the means by which these gates determine which remote station receives this encoded signal, as enabled by the wires in the cable 137 from the station strobe counter 135 and the decoder 136. The gate 141 is the only one of the uppermost gates 141, 155 and 156 which is energized at this moment because it is the only one selected via the wire 198 to be addressed by the station strobe counter 135 and decoder 136. The other corresponding gates whose top inputs were enabled by the signal appearing for 5 bits duration on wire $a$ are not active because they represent nonpolled remote stations. Their lowermost inputs will become activated during other time slots than the one presently being discussed.

However, this one-at-a-time selection is not true of the gate 142 and the other corresponding gates 150 and 151 which are about to be enabled by output on wire b. When the 5-bit block has been read out of the gate 141 through the OR gate 144 and into the transmitter 138, the cycle logic circuit 122 and the control latch 131 move the output from wire a to wire b, which enables one input wire at each of the gates 142, 150 and 151. Each of their other inputs is connected with a different message register 23, 24, ... and 25, all of which are at the present time circulating their contents at the 10 kHz. rate. The gate 142 serially reads out mode and display data being circulated in the message register 23. The gate 150 serially reads out the mode and display data taken from the register 24, and the gate 151 reads out the mode display data taken from the message register 25, and the contents of all of those registers are being read out simultaneously but via different wires in the cable 149 which lead to different associated remote stations. The manner in which the data contained within the registers 23, 24, and 25 is handled and updated will be discussed presently. However, for purposes of the instant discussion, it is enough to say that each register contains, among other data, 5 mode bits plus 72 bits of information relating to 18 different characters of 4-bits each, corresponding with the 18 Nixie tubes in the display 15 shown at the top of FIG. 3 of the drawings.

After these five mode bits plus 72 display bits have been counted out during 77 steps of the counter 121, the enabling signal on wire b from the latch 131 disappears, and a signal appears on wire c to enable the gates 143, 153, and 154. These gates receive during time slots when they are respectively enabled different 4-bit characters from the computer via cable 152. These 4bits complete the message frame shown in FIG. 6 and comprise a subblock to operate a printer at a remote station, such as the printer 18, to print one character on the paper tape 19 shown near the bottom of FIG. 3. All of the remote units receive printer information provided such information is currently available at the stage at which the associated remote station is currently operating in its cycle of overall transaction entry events.

Referring now to the top of FIG. 4, the executive unit 20 receives information one character at a time from whichever remote station is being polled. Only a single data character is transmitted to the executive unit during each time slot, and then only from the polled remote station. When these inputs arrive, respectively on wires 106, 112, and 113, they enter the receiver and demodulator 126. In view of the fact that the signals arriving at the receiver are serially modulated upon carriers, the output on wire 126b is also serial and is fed into an input register 125. The serial data is also delivered to the parity flip-flop 160 so that the parity flip-flop is toggled by each binary 1, and at the end of the input to the receiver 126 it has either an odd or an even output. The present system is looking for an odd parity check resulting in an output on the "odd" wire 161. Failure of parity would provide an output on "even" wire 162 from the flip-flop 160. This incoming character may include both operand data and a program request, as mentioned above.

When a particular station is polled by a suitable output into the cable 137 from the station strobe decoder 136 so that one of the gates 141, 155, or 156 becomes enabled, the cycle logic circuit 122 opens a window by delivering an output on wire 123 to toggle the data gate flip-flop 163 and place an input enabling signal on wire 164 to the input register 125 to start accepting the serial data on the wire 126b. At the end of 11 bits, i.e. 11 steps of the counter 121, the window is closed by a signal appearing on wire 124 which rests the flip-flop 163, at the same time enabling the wire 165 to the gate 166. If the parity check is okay, a signal will be present on wire 161 and will enable the other input to the gate 166 to provide an output on wire 166a enabling the AND gate 167. The cycle logic circuit 122 will then put out a signal on wire 127 indicating a start point for the computer operation, and the AND gate 167 will provide an output to set the switchover flip-flop 169 and provide a steady output on wire 170. This is a computer program start signal which travels downwardly into the computer 30 and causes it to accept the parallel binary signal contained in the input register 125 and appearing on the computer input bus wires 171. The computer 30 then accepts the parallel binary input signal on the bus wires 171 an performs whatever function is indicated by the stage in the entry program already attained by the particular remote register being polled. When the computer has completed its function, it then delivers a signal on wire 172 indicating "program complete," and this signal will reset the switchover flip-flop 169, as will be discussed in greater detail in connection with FIG. 5.

On the other hand, if the parity check fails and an output appears on the wire 162 instead of on the wire 161, this output will be inverted by the inverter 173 which will then remove the enabling signal from wire 133 and leave the AND gate 132 blocked. Thus, when the 100 step counter 121 reaches the end of the data block, the "next block" signal on wire 134 which normally steps the station strobe counter 135 to poll the next remote station in the sequence will be prevented from stepping to the next station. As a result, the counter 135 will not advance when the parity check fails, with the result that the same station will be polled again during the next time slot counted out by the counter 121 and the cycle logic circuit 122. This initiates a repeat of the preceding information entry steps in the hope that the next exchange of data from the same remote station to the executive unit 20 will result in a proper parity check. If not the station will then be polled again. Presumably, the polling will have resulted in a satisfactory transfer of input data, and the signal will disappear from wire 162 allowing the enabling signal to return on wire 133 so that at the end of the current data block time slot the signal on wire 134 will step the strobe counter 135 to poll the next remote station for its data. In the practical system, logic is provided to step ahead to the next station after a certain number of repeat attempts even if the data transfer continues to fail.

Referring now to FIG. 5, this figure shows three message registers 23, 24, and 25 all continuously associated with the same three remote stations illustrated in the drawings and comprising remote station number 1, remote station number 2, ... and remote station number 0N. These are shift registers having 100 bits and normally shifted by the 10 kHz. clock source 120 through the wire 157. This wire goes to the gates 177, 179, and 181. The master oscillator 128 operates at 500 kHz. and is shown at the top of FIG. 5. As indicated above the system normally proceeds in step with the 10 kHz. oscillator output, but the computer operates at a much higher pulse rate, namely 500 kHz. When one of the message registers 23, 24, or 25 is shifted to cooperate with the computer 30, its circulating clock rate must be changed from the 10 kHz. source 120 to the 500 kHz. rate of the oscillator 128 in order to make its operation compatible with the computer. This is done by filing in the remaining pulses from the oscillator 128 that were removed by the 50 counter 212, i.e. by enabling the gate 180 as will be explained hereinafter.

The information contained in the registers 23, 24, or 25 relates to the messages to be sent to the associated remote stations during each time slot. Each remote station display has 18 characters at four bits per character, thus requiring 72 of the 100 bits available in each of the registers 23, 24, and 25. Five more of these bits are used to store mode information. The remaining bits can be used to store other data, or else they may not be used at all except to keep these registers in step with the 100-bit counter 121 in the 10 kHz. clock system of the executive unit 20.

The information in the message registers, such as the register 23 which is associated with remote station number 01 and therefore will be described in some detail, is from time to time withdrawn from the register by the computer, is processed to update it, and then is returned to the register 23 where it remains for the time being, although it is also read out into the message block by the gates shown at the bottom of FIG. 4 once per time slot to refresh the display Nixies in the associated remote station. Normally, the data in the register 23, and in the other message registers 24 and 25 as well, is being circulated through a path P which leaves the message register 23 via the wire 194 and passes through a normally enabled gate 189 and through a an OR gate 190 to the wire 195 by which the data is again returned to the input of the shift register 23, it being clocked through the register by clock pulses from the OR gate 184. The gates 180, 181 and the corresponding gates 176, 177 and 178, 179 of the other message registers are normally maintained enabled by outputs from the gates 215, 216 and 217. These are AND-inverting gates which operate to provide an inactive output when both of their inputs are active. However, since there is no signal on wire 196 most of the time, the outputs of the gates on wires 215a, 216a and 217a are generally active, as will be referred to again hereinafter. The 10 kHz. clock pulses enter the generally conductive gates 181, 179, and 177 via the wire 157, and keep the data continuously circulating through the path 194, 189, 190, and 195 in the register 23, and similarly in the other message registers 24, ... and 25.

If the parity check is okay and the switchover flip-flop 169 has been set, the output appearing on wire 170 enables one input to the gate 180, as well as one input to the gates 178 and 176 associated with the other message registers 24, ... and 25. However, only one of the gates 176, 178, and 180 can be conductive at a time, namely the gate corresponding with the polled station. In this case, the polled station is assumed to be 01, and therefore the wire 198 from the decoder 136 is energized during the present time slot so that the gate 180 is also energized at a second input, but the other gates 176, and 178 remain blocked. Although the 500 kHz. clock output on wire 199 from the oscillator 128 is connected to all of the gates 176, 178, and 180, only the gate 180 is enabled at the present time, and therefore its output passes through the OR gate 184 and causes the message register 23 to shift at a 500 kHz. rate. The data therefore now circulates in the path 194, 189, 190, and 195 at the higher rate compatible with computer operation. It is important to note that the start point signal on wire 127 from the cycle logic circuit 122 enabled the gate 167 to set the switchover flip-flop 169 at a predetermined point in the time slot cycle, and therefore the change over to the 500 kHz. clock rate is not random but occurs at the start of the computer program.

The CPU program start signal on the wire 170 also passes downwardly and into the computer to initiate its operation, and to cause it to receive via the parallel input bus 171 the contents of the input register 125 which will include program and operand characters from the remote station. The computer then sends out a signal on wire 200 to enable the gate 188 and cause it to read out the contents of the message register 23 into the computer via the wire 201 at the 500 kHz. rate so that the computer can update the data from the message register 23 and later return it to register in the manner to be presently described.

The CPU completes its task relating to the particular digit concerning which it has just received information on the parallel input bus 171, and when it has completed its task and updated the corresponding digit of the information extracted from the message register 23, it delivers a signal on wire 202 to enable the gate 191, the signal on the wire 200 having been disabled. The computer then sends the updated message through the wire 203, the AND gate 191, and the OR gate 190 to reinsert the updated data into the message register 23. As stated above, the circulating data gate 189 is normally enabled by the wire 204 in the absence of a signal on the wire 202. However, when the signal appears on wire 202 the inverter 192 removes the enabling signal from the wire 204 and thereby blocks the old data which until now was still being circulated through the register 23 so that this data is read out into a dead end at the gate 189. Simultaneously, the computer is reading the updated message into the OR gate 190, the wire 195, and into the message register 23. In this way, the newly updated data is substituted for the old data, and the new data then continues to circulate in the message register 23. The new data can circulate in the path P because the signal is removed from the wire 202 as soon as the computer has finished reading out the new message, and therefore the inverter 192 returns the enabling signal to wire 204 in time to permit the new data in the register 23 to be again circulated in the path 194, 189, 190, and 195.

When the program has been completed, the computer sends out a signal on wire 172 which sets the switchback control flip-flop 175 energizing wire 196 and thereby blocking the gates 180 and 181 through the AND inverting gate 215. The program complete signal on wire 172 is timed such that at the instant when it appears the information in the message register 23 is ready to start a new transmission block, but since both gates 180 and 181 are blocked, the register 23 remains static until output appears on wire 134 signalling the beginning of the next block. This signal resets the flip-flop 175, removes the signal on wire 196 thereby reenables the wire 215a. This allows 10 kHz. pulses to pass through the gate 181 to clock the register 23 in synchronism with the other registers 24, ... and 25. During the next time slot, the revised data in the message register 23 will be read out via the wire 205 into the cable 149 and through the appropriate transmitter 138 so as to refresh the Nixie tubes in the display 15 at the top of FIG. 3. Moreover, the computer formats an output character for the printer comprising 4 data bits to be sent to that particular remote station, and transfers these data bits through the gates 187 into the printer lines 152, and eventually to the gate 143 and the transmitter 138. The program-complete signal on wire 172 also resets the switchover flip-flop 169 and thereby removes the computer program signal from wire 170 until a subsequent time slot during which a new computer program will be commenced by information from a different remote station.

KEYBOARD ENTRY OPERATING SEQUENCE

Figure 7:
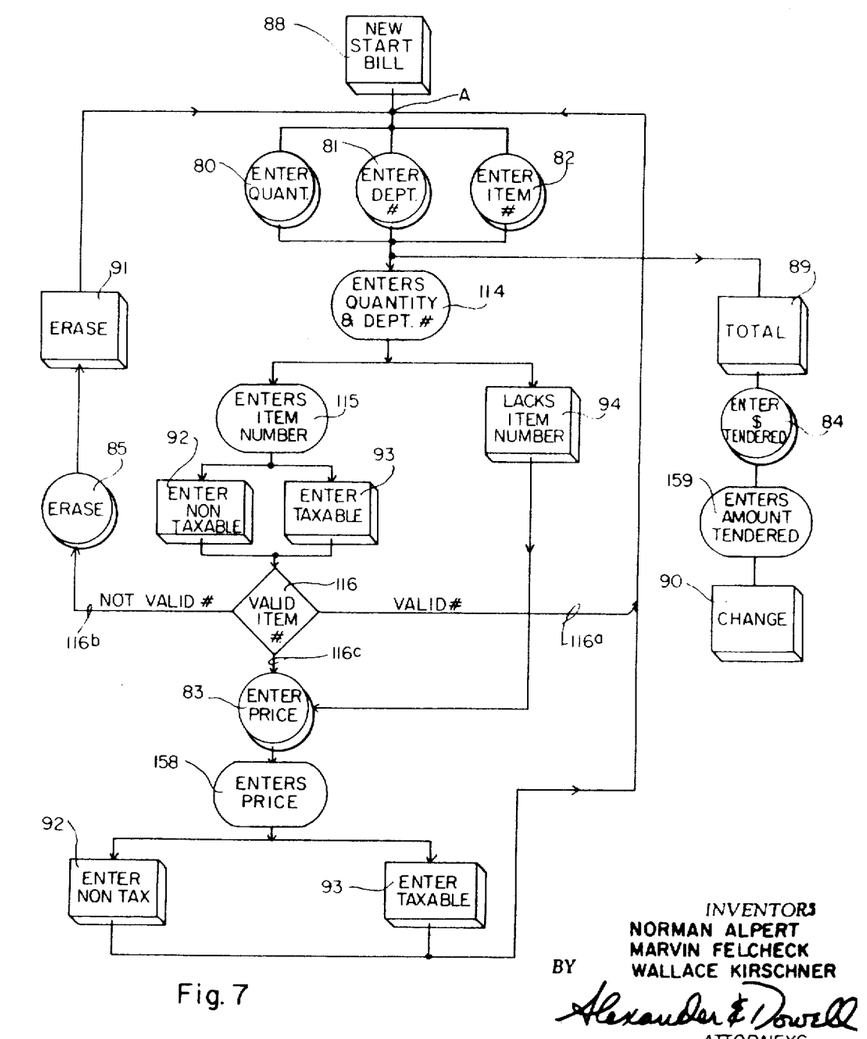
FIG. 7 is a flow diagram showing the sequence of events occurring during entry and display of data by this system.

FIG. 7 is a chart indicating the sequence of events performed during typical entry at one of the remote stations. The first step performed in using the system is to press the start new bill key 88 which is connected through a bundle of wires 79 in FIG. 2 to the keyboard sequence control 75. The keyboard synchronizer 78 strobes the keyboard entry, and a start new bill signal will be delivered on the wires 75c to the 7-bit program storage register 77. This register stores the encoded program signal from the key 88 as a 7-bit parallel message and sets it into the transmitter register 100 during the step 01 of the program counter 95 in response to a signal on wire 98. The program counter 95 then steps to position 02 where it pauses, and the next time the executive unit 20 poles the first remote station in FIG. 2, the station program step counter 95 receives a signal on wire 58a to step it to the 03 position and deliver an output on wire 99 to enable the gate 101 and admit 10 kHz. clock pulses from wire 54a into the transmitter shift register 100, and thereby shift its output onto wire 102 to the OR gate 103, and through the enabled AND gate 104 to the transmitter 105. The transmitter thus delivers the program from the register 100 through the wire 106 as a modulated signal, which is then received at the receiver 126 located at the top of FIG. 4. The receiver demodulates this signal and, during the window occurring at the same time because the wire 123 has enabled the data gate flip-flop 163, an enabling signal is delivered on wire 164 causing the serially demodulated output of the receiver 126 to be entered into the input register 125 where it is stored in parallel form. Going back to FIG. 2, as the program signal is read out of the transmitter register 100 on the wire 102 the parity flip-flop 112 is toggled back and forth by each binary "one". Depending upon whether an odd or an even number of "ones" has been transmitted in the program signal from the register 100, the parity flip-flop adds another digit in the form of a "zero" or a "one" in order to maintain odd parity. An output from the logic circuit 107 indicates when the transmission from the register 100 is complete. If the parity flip-flop 112 indicates an even number of "ones" has passed from the transmitter register 100 when the wire 108 enables the gate 110, an additional odd parity digit is delivered from the flip-flop 112 and the gate 110 through the wire 111 and the OR gate 103 into the still-enabled AND gate 104. At the top of FIG. 4, the demodulated signal appears on wire 126b and toggles the parity flip-flop 160 back and forth. If an odd number of "ones" has passed while the receiver 126 is reading out the signal, an "okay" signal remains on wire 161 and enables the gate 166. At the end of the 12-bit window as determined by the signals on the wires 123 and 124 from the cycle logic circuit 122, the data gate flip-flop 163 is reset and an output appears on wire 166. At this time the program signal from the keyboard key 88 appears as parallel stored bits in the input register 125, and assuming that its parity has checked-out "okay" , an enabling signal will appear on wire 166a to enable the gate 167 at one of its terminals. After the 12-bit window is concluded, the cycle logic circuit 122 will deliver an output in the form of a "-start" signal on wire 127, and this signal will enable the other input to the gate 167 so that the switchover flip-flop 169 will be set and will deliver a computer program start signal on wire 170. This start signal enables one input to each of the gates 180, 178, and 176 for the purpose hereinafter stated.

Conversely, if the parity had not checked "okay," the flip-flop 160 would have been left in a condition to deliver an output on wire 162, and this signal would have been inverted by the inverter 173 and would block the normally conductive gate 132. At the end of the time slot presently in progress, the output on wire 134 from the 100 step counter 121 would have been blocked by the gate 132, and therefore the station strobe counter 135 would not have been stepped forward to select the next remote station, but would have continued to select the present station, thereby giving the latter an opportunity during the next time slot to repeat its message to the executive unit 20 in the hope that the parity signal would check properly during the repeat.

Going back to showing in FIG. 5, it has just been stated that the gate 180 has one of its inputs enabled, namely by the wire 170. Another of the inputs to gate 180 is enabled by a wire 198 coming from the station strobe counter 135 and decoder 136, indicating that it is station 01 which is being polled. Since such a signal is lacking at the gates 178 and 176, they are inoperative, but in view of the fact that both enabling signals at gate 180 are activated, the 500 kHz. pulses from the clock 128 can begin passing through the gate 180 through the OR gate 184 as soon as the switchback flip-flop 175 is reset to increase the counting rate of the message shift register 23 to 500 kHz. equaling the rate at which the computer 30 performs its operations. In addition, the signal from the computer program start wire 170 enters the computer 30 and causes it to begin performing its processing functions in behalf of remote station 01, as internally programmed in the computer 30. This performance includes the reception of the program signals on the 7-bit parallel bus 171 comprising the input to the computer. In response to initiation of its function, the computer then enables the gate 188 by an output on wire 200, and receives it the present content, if any, of the message register 23 via the wire 201. The computer having recognized that the input received is a "start new bill" command, then enables the wire 202 to enable the gate 191 and disable the gate 189 via the inverter 192 and the wire 204. Thus, the data being circulated in the message register dead ends at the gate 189, while at the same time the computer is reading out a new mode message through the wire 203, the gate 191, the gate 190 and the wire 195. This mode message is clocked into the message register 23 at the 500 kHz. rate, and when it is concluded the enabling signal then disappears from the wire 202, thereby disabling the gate 191 and enabling the gate 189 so that the new mode message can continue to circulate in the register 23 through the circulating path P including the wire 194, the gate 189, the gate 190, and the wire 195. As the message circulates it becomes available on the wire 205 which enters the gate 142 via cable 149 at the bottom of FIG. 4, and is delivered to the transmitter when the wire b is also enabled by the control latch 131, namely at the appropriate time in the message cycle shown in FIG. 6. The computer then sends out its program complete signal on wire 172, and this signal sets the switchback control flip-flop 175 which disables the gate 180 and the gate 181 via the inverting AND gate 217, thereby removing from the register 23 all of the clock pulses. The message register 23 now remains static until the arrival of the new block signal on wire 134 which resets the switchback flip-flop 175 allowing an enabling signal to reappear on wire 217a to enable the gate 181. Once again the message in the register 23 circulates at a rate compatible with the noncomputer portion of the system as shown in FIGS. 2,3, and 4, and the message now in the register 23 is read out by the transmitter 138 on the wire 50 to the receiver 51 of the remote station 01 and includes a mode signal which is decoded in the decoder 59 as will be hereinafter explained.

Recalling that the preceding several paragraphs describe events occurring as a result of the operator at station 01 pressing the start new bill key 88, the mode signal delivered by the computer 30 and changed back into parallel form by the mode register 59 in FIG. 3 is delivered on the five wires in the cable 59a and is decoded in the mode decoder 60. An appropriate signal appears on one of the wires in the cable 61 and is delivered to the keyboard sequence control 75 to perform the following functions at the keyboard. The meaning of this first mode signal is that the system has been properly cleared and reset. This indication is made to the operator located at the local keyboard by illumination of the "enter quantity" light 80, and the "enter department" light 81 on the keyboard, and as shown in FIG. 7 in the flow chart.

The flow chart next shows in the oval shaped step 114, an indication that the operator should now enter the number of items via the quantity keyboard 86, and then enter the department number via the amount keys 87 of the keyboard. These entries go through the same procedures as the "start new bill" program signal just discussed, except that since these entries are data entries instead of program entries they go into the transmitter register 100 as 4-bit data signals passing through the storage register 76. Since a data entry is accompanied by an indication of what to do with it, the system automatically enters into the register 77 a desired program entry. From the registers 76 and 77, these entries are made as discussed above by setting the signals into the transmitter register 100, passing them through the parity circuit at the bottom of FIG. 2, and through the transmitter 105, and into the input bus 171 of the computer via the receiver 126 and the input register 125, first having checked parity. The computer enters them in the proper digital position of the message according to its own internal program, namely as one of the 18 display characters of the subblock 44 of the message shown in FIG. 6. The system then circulates this information in the message register 23, and eventually reads it back through the transmitter 138 and the message wire 50 to the receiver 51 located in the remote station 01. The display of this message will be discussed hereinafter. No change in mode signal occurs at this stage in the proceeding. The entry of the three digits, respectively representing the quantity and the department number, requires at least three successive time slot cycles in view of the fact that only one character can be transferred per time slot cycle to the message register 23 from the keyboard 16.

As indicated above, the pressing of the quantity key does not change the mode message from the computer, but when two department digits have been entered, the computer now returns a different mode signal via message subblock 43, thereby changing the wire which is energized in the group of wires 61 from the 5-bit mode storage 60. This change in mode signal extinguishes the enter quantity and enter department lights 80 and 81, and illuminates the enter "item number"

light, at the same time enabling the "nontax" and "taxable" keys 92 and 93 as well as the "lacks item number" key 94. If the operator of the system has an item number, he then enters it via the amount keys 87, and this entry is indicated by the oval step labeled 115 in FIG. 7. The operator enters the item number and presses either the nontax key 92 or the taxable key 93 which enters the item number and indicates to the computer the taxable status of the item represented thereby. There is no change in the mode signal returned by the computer as a result of entry of the item number if it is a valid item number. The validity of the number is checked by the computer, which also waits for the depression of a taxable or a nontaxable entry key. The item number itself via the storage register 76, whereas the program step representing either the taxable or nontaxable nature of the item is entered via the register 77 since it is a program indication rather than data. Again, all of these entries are made one data character and/or one program command character at a time, each successive group of such characters being entered during a different polled time slot. The question of validity of the item number is checked in the computer by a step represented by the diamond 116 on the flow chart of FIG. 7, and if the item is valid the computer issues a new mode signal returning the system via the path 116a to the second step ready for entry of a new item. By its internal program, the computer also enters the price of the item on the bill being prepared, and incidentally issues serial data on wires 206 to be formatted into the message subblock 45 going to the printer via the gate 187 and the gate 143 at the bottom of FIG. 4. If the item number is valid, but the computer is storing no price corresponding therewith, the computer returns a mode signal which illuminates the enter-price light 83. This course of action is represented by the line 116c on FIG. 7.

On the other hand, if the item number is not a valid number, the flow chart proceeds in the direction indicated by the reference character 116b, at which time the computer sends out a mode signal which is received and decoded at the decoder 60 which signal enables another wire in the group of wires 61 to light the erase light 85 and enable the erase key 91. The operator then presses the erase key 91 which removes the entry from the system and allows the operator to make a new entry. The pressing of the erase key obliterates the nonvalid item number read into the computer, and resets the computer to receive a new message. In the meanwhile, the message in the register 23 can be erased by blocking its circulation, for instance by having the computer enable the wire 202 during one complete message block without sending any new data on the wire 203 to substitute. In this manner, the message in the register is read into a block gate 189 and is effectively erased. Having erased the previous entry, the operator at the remote station is then free to begin all over again to make a new entry, commencing at the point A in the flow diagram of FIG. 7.

There is an additional possibility, namely that the clerk is selling something at the remote station which has had no item number whatever assigned to it. In this event, of course, he cannot enter an item number, but instead he presses the "lacks item number" key 94. The computer receives this instruction through the program storage register 77 and returns as a part of its message a mode signal 43 which illuminates the enter price light 83 and enables the amount keys 87. The operator then enters the remotely determined price of the item, going through the oval step indicated at 158 in the flow chart of GIG. 7, and in addition enters either a nontax indication by pressing the key 92 or a taxable indication by pressing the key 93. The computer then, enters the cash from the keyboard keys 87 in its appropriate memory associated with that department and issues a mode signal to the local station returning the system to point A in the flow chart of FIG. 7, at which point it is prepared to receive the entry of a new item.

The operator continues in like manner entering items on the bill until all items being purchased have been entered, and then he indicates this fact by depressing the total key 89. The computer returns a mode signal illuminating the indicator lamp 84 instructing the operator to enter the amount of money tendered by the customer. The operator makes this entry on the keyboard as indicated by the oval step 159 in FIG. 7, and then presses the change key 90, thereby sending an instruction through the storage register 77 to the computer indicating that the full amount of money tendered has been entered. The computer then computes and displays the change due, entering the amount of change in the message subblock 44 via the message register 23, from where it is read into the display at the remote station number 01.

At each stage in the preceding, the contents of the message register 23 are read back in serial fashion through the wires 50 and 52. Each time, the remote station accepts the message for display, and in addition knows that it is being polled if its own identifying address appears at the beginning of the message in the encoded 5 bits of the subblock 42, as detected by the detector 58 in FIG. 3. The mode register 59 retains the next 5 bits in the subblock 43 indicating the stage in the proceeding at which the computer judges the system to be operating with respect to that particular remote station. Moreover, the computer reads out data to be printed by the printer 18 at appropriate stages in the operation of the system, namely indicating the prices of items purchased, the subtotal, the tax, the total, the amount tendered, and the change. These items are printed one character at a time appearing during different subsequent time slots, the print characters being retained and recognized by the decoder circuit 69 in FIG. 3. However, the display items corresponding with the printed items mentioned above are displayed on-the-fly as they pass through the system, namely without storage. Thus, the display Nixies shown at the top of FIG. 3 are all refreshed during each and every time slot.

The manner of the display is as follows. The data numerals enter the display register 65, FIG. 3, 4 bits at a time and are read out on the four wires 66 to the 4-bit latch 67 which remembers them temporarily. They represent one number, from zero through 9, and the number represented is applied to a corresponding cathode in every one of the Nixie tubes 15. Every group of 4 bits in the message subblock 44 constitutes a new character, and these bits are counted out by the counter 62 through the gate 63 which is enabled by wire 56c only during the subblock 44. Every 4th bit counted by the counter 62 constitutes a new character and provides an output on wire 62a to shift the Nixie anode selector 64 to select the next adjacent Nixie tube, the shift occurring from left to right. All 18 anodes are selected during the readout occurring during each time slot, and these sequential selections occur simultaneously at all active remote stations, although the specific messages to the remote stations differ from station to station since they come from different message registers, for instance the registers 23, 24,... and 25 of FIG. 5, and through different transmitters 138, 139 ... or 140 at the bottom of FIG. 4. At any rate, all Nixie tubes are refreshed once during each of the succeeding time slots, although certain of them may not actually receive any inputs if there are no corresponding messages being transmitted at the moment.

Likewise, the messages occurring during the subblocks 42, 43, and 45 also repeat simultaneously at all remote stations, although their specific message contents differ from station to station. The mark-time signal 41 is common to all stations and does not differ from station to station since it serves to synchronize all of the time clocks.

As pointed out above, one distinctive characteristic of the present system is that the remote stations are all polled successively during different time slots, and that the individual remote stations transfer to the computer only one character or one digit each time they are polled, as distinguished from the transfer of a precomposed and organized message as is usually done by other systems used for the same general purpose. All message composing is done at the computer and the executive unit, which together compose the incoming information transferred one character at a time during different time slots into complete messages which are then processed and returned to all of the different remote stations to refresh their Nixie tube displays during every time slot, the individual Nixie tubes operating on a sequential time sharing basis at the display in each remote station.

The system is also provided with indicators 118a, 118b, and 118c located next to the display 15 and shown at the top of FIG. 3 to indicate whether the dollar amounts displayed on the Nixie tubes represent "totals" as indicated when the light 118a is illuminated, "cash tendered" as indicated when the light 118b is illuminated, or "change" as indicated when the light 118c is illuminated.

The keyboard may also include a normally locked door 174 having beneath it a series of special controls, including for instance an on-off switch, a switch for voiding an entire bill, and/or suitable means for accessing computer memories for reading back certain data representing for instance cash in the drawer, total sales or perhaps inventory of certain items, etc.

Having thus described a practical embodiment of our invention, we now present the following claims.

We claim:

1. A time-sharing system for entering information including data relating to transactions conducted at multiple remote stations and for processing and storing portions of the data at a central processing unit and returning processed data in the form of composed messages to the stations a portion of which is displayed thereat, the system comprising:
   a. participating stations each having entry means for entering data one character at a time and sequentially forming each character into a multiple-bit group, and each station having multiple character digital display means;
   b. computer means at the central processing unit; and
   c. an executive unit located at the central processing unit and coupled to the respective remote stations by data links, the executive unit including multiplexer means operative to develop a repeating cycle of time slots and including means for polling one of said stations during each slot, input means for receiving a character group from the station being polled and for delivering each received group to the computer means, separate message register means associated with each participating station and individually connectable to the computer means to have its contents updated thereby in response to the polling of the corresponding station, said executive unit further including separate means corresponding with each participating station for composing a message including the contents of each corresponding register means, and means for transferring every composed message to each corresponding remote station during successive time slots whether or not that station is being polled.

2. In a system as set forth in claim 1, said entry means at each station including means for encoding and retaining a character group, said multiplexer means having means operative during each polled time slot for sending as part of the composed message an enable signal to initiate transfer of the character group at the polled station through the data link to the input means in the executive unit, and said executive unit including means operative to actuate the computer means to accept and process the character group and to update the message in the message register means of the polled station in response thereto.

3. In a system as set forth in claim 1, said entry means at each station including means for encoding a character group including a parity bit, said multiplexer means having means operative during a polled time slot for sending an enable signal to transfer said character group through the data link to the input means in the executive unit, parity check means in the executive unit associated with the input means and responsive to correct parity to actuate the computer means to accept and process the character group and to update the message in the message register means in response thereto, station counter means in the multiplexer means for advancing the polling from one time slot to the next, and said parity check means including means operative to halt such advance upon failure of parity whereby a further transfer of the character group from the same station will be made through the data link during the next time slot.

4. In a system as set forth in claim 1, the entry means at each participating station including encoded command means each operative to inform the computer means how the data entered at that station is to be processed, said command means forming multiple-bit groups receivable as are data character groups at said input means of the executive unit for delivery to the computer means.

5. In a system as set forth in claim 1, said executive unit including time clock means operative to count out said repeating cycle and including cycle logic means to determine said time slots, means for dividing each slot into multiple bit words whose succession comprises the format of the messages composed and transferred to the remote stations through the respective data links, said clock means having outputs marking the boundaries of each slot; and station counter means responsive to said outputs for advancing said enable signal from one time slot to the next and operative to successively enable said input means to receive during each slot a character group formed by the remote station polled during that slot.

6. In a system as set forth in claim 5, said composing and transferring means in the executive unit including cyclic message block formatter means associated with each remote station and actuated by the clock means to enable the transfer of successive subblocks of the message block including signals operative to initiate the entry of new character groups at said entry means, and said executive unit including transmitter means corresponding with each station to transfer the contents of the message block associated with that station through the data link to the display means at that station.

7. In a system as set forth in claim 6, said clock means including means for simultaneously enabling all of the formatter means during every time slot to read out the contents of the associated message register means to the display means of the corresponding remote stations.

8. In a system as set forth in claim 1, said contents of the message register means comprising multiple digits corresponding with like digits of the display means at the remote station associated with that register means; means operative during the time slot while that station is being polled and responsive to receipt at the input means of a character group representing one of said digits to actuate the computer means to update the contents of the same digit of the message register in accordance with the received character group.

9. In a system as set forth in claim 1, clock means in said executive unit; said message register means comprising a multiple digit shift register driven by said clock means, and a circulating path connected to take data from the output of the shift register and reenter it into the input of the shift register at the clock rate; means operative when that station is polled and responsive to receipt at the input means of a character group to actuate the computer means to accept that character group, to withdraw the circulating digits of the message from the shift register and process it to incrementally update its contents in accordance with that character group received during that polled time slot, and to substitute the incrementally update message back into the shift register.

10. In a system as set forth in claim 9, said executive unit including a second clock means selectable to circulate the contents of the shift register means at a higher rate during computer processing of the data from the corresponding remote station when polled, said executive unit further including means for polling a remote station during the early portion of the time slot and enabling it to send a character group to update the message in the associated shift register, and including means for selecting said second clock means and for processing the data in the corresponding shift register to update it during a subsequent portion of the same polling time slot.

11. A time sharing system operable in a sequence of preprogrammed steps for entering information including data relating to transactions conducted at multiple remote stations, and for processing and storing portions of the data at a central processing unit and returning processed data in the form of composed messages to the stations a portion of which is displayed thereat, the system comprising:
   a. at each station entry means for entering data one character at a time and for forming each character into a multiple bit group, plural diverse mode indicating means sequentially operable to indicate the step in said sequence at which the station is currently operating, command means operable to encode a command signal into a multiple bit group for indicating the manner of processing entered data, and processed data display means;
   b. computer means at the central processing unit programmed to cooperate with said preprogrammed sequence of steps;
   c. an executive unit located at the central processing unit and coupled to the respective remote stations by data links, the executive unit including multiplexer means operative to poll one of said stations at a time, input means for receiving a multiple bit group from the station being polled and for delivering each received group to the computer means, separate message register means associated with each station and individually connectable to the computer means to have its contents updated thereby in response to the polling of the corresponding station, said executive unit further including separate means corresponding with each station for composing a message including the contents of each corresponding register means, and means for transferring every composed message via said data links to the display means in each corresponding station each time any station is polled; and
   d. mode means at the central processing unit responsive to the processing of data from a polled station for entering into the composed message to that station a mode signal for operating that station's mode indicating means to show the step to be performed next in the sequence.

12. In a system as set forth in claim 11, said entry means at each station including keyboard means and means for encoding each character entered thereby to form and hold a binary character group together with said command signal group; means responsive to the polling of that station to transfer said character group and command signal group to the executive unit input means; and means in the executive unit multiplexer means for actuating the computer means to process said groups and deliver to the message register means updated data and a mode signal.

13. In a system as set forth in claim 11, the multiplexer means in the executive unit including master clock means and logic means operative to develop a repeating cycle of time slots, each slot being of duration at least equal to the length of the binary contents of the composed message and the contents of every message register means being composed and transferred to the associated station during every polling time slot.

14. In a system as set forth in claim 13, means for dividing each time slot into multiple-bit words whose succession comprises the format of the messages transferred to the remote stations; time clock means and logic means at each remote station for counting out cycles of similarly divided time slots; means in the executive unit for developing and including in each message format synchronizing signals marking boundaries of said time slots and means at each remote unit responsive to said marking signals for synchronizing its time clock means and logic therewith.

15. In a system as set forth in claim 14, said composing and transferring means in the executive unit including cyclic message block formatter means associated with each remote station and actuated by the clock means to enable the transfer of successive subblocks of the message block including signals operative to enable the entry of new character groups at said entry means, and including transmitter means to transfer the contents of the message block associated with the remote station through the data link to the display means at that station.

16. In a system as set forth in claim 15, cyclic means in each remote station for dividing transferred messages into subblocks and decoding said subblocks to obtain said synchronizing signals, said mode signals, and multiple display data digits; the display means in each station having multiple digital display devices corresponding in sequence with said decoded data digits; and each station including means driven by the station's time clock means for sequentially coupling each data digit when decoded to an appropriate display device in said sequence.

17. In a system as set forth in claim 16, said data digits occurring with the most-significant digit first, and said system including logic means for suppressing the display of nonsignificant zeros by gating OFF corresponding display devices until a digit other than a zero occurs.

18. In a system as set forth in claim 16, said computer means generating encoded printer data included in said transferred messages, and each station including printer means, and means for decoding said printer data and applying it to said printer means.

19. In a system set forth in claim 16, each message register means comprising a multiple digit shift register driven by said clock means, and a circulating path connected to take data from the output of the shift register and reenter it into the input of the shift register at the clock rate; means operative when the corresponding station is polled and responsive to receipt at the input means of a character group to actuate the computer means to accept the character group, to withdraw the circulating digits of the message from the shift register and process it to update its contents in accordance with said character group, and to substitute the updated message back into the shift register.

20. In a system as set forth in claim 19, said message block formatter means including means for transferring said entry enable signal into a remote station being polled during an early portion of the time slot prior to said display data transfer, means for actuating said computer means to process the input data group at a rate which is much higher than the time slot data rate and substitute it back into the message shift register during the same time slot.